(12) United States Patent
Yang et al.

(10) Patent No.: US 10,594,348 B2
(45) Date of Patent: Mar. 17, 2020

(54) CARD SOCKET, CARD CONNECTOR, AND MANUFACTURING METHOD THEREFOR

(71) Applicant: Molex, LLC, Lisle, IL (US)

(72) Inventors: In Chull Yang, Ansan (KR); Eun Guk Kim, Ansan (KR); Da Woon Lee, Ansan (KR)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 15/558,109

(22) PCT Filed: Dec. 30, 2016

(86) PCT No.: PCT/KR2016/015557
§ 371 (c)(1),
(2) Date: Sep. 13, 2017

(87) PCT Pub. No.: WO2017/116206
PCT Pub. Date: Jul. 6, 2017

(65) Prior Publication Data
US 2018/0316377 A1 Nov. 1, 2018

(30) Foreign Application Priority Data

Dec. 31, 2015 (KR) ........................ 10-2015-0190642
Mar. 8, 2016 (KR) ........................ 10-2016-0027828

(51) Int. Cl.
*H04B 1/3816* (2015.01)
*G06K 13/08* (2006.01)
(Continued)

(52) U.S. Cl.
CPC ............ *H04B 1/3816* (2013.01); *G06K 7/00* (2013.01); *G06K 7/0021* (2013.01);
(Continued)

(58) Field of Classification Search
CPC . H04B 1/3816; H04M 1/026; G06K 13/0812; G06K 7/00; G06K 13/085
(Continued)

(56) References Cited

U.S. PATENT DOCUMENTS 5,403,208 A * 4/1995 Felcman .............. H01R 12/721
439/60
6,053,748 A * 4/2000 Bricaud .............. G06K 7/0021
439/76.1
(Continued)

FOREIGN PATENT DOCUMENTS

CN 1189229 A 7/1998
CN 201608308 U 10/2010
(Continued)

*Primary Examiner* — Eugene Yun
(74) *Attorney, Agent, or Firm* — Molex, LLC

(57) ABSTRACT

The present disclosure relates to a card socket into which a card tray capable of loading a plurality of electronic cards is inserted, a card connector, and a manufacturing method therefor. According to one embodiment of the present disclosure, a card socket is for electrically connecting a card having a terminal unit to an electronic device, the card socket comprising: a conductive shell; a nonconductive middle plate; an upper contact terminal; and a lower housing having a lower contact terminal, wherein the upper contact terminal is integrally coupled to the shell by interposing the middle plate therebetween, and the shell is coupled to the lower housing so as to form, therein, an accommodation space in which at least one card is accommodated.

15 Claims, 14 Drawing Sheets

(51) Int. Cl.
*G06K 7/00* (2006.01)
*H04M 1/02* (2006.01)

(52) U.S. Cl.
CPC ......... *G06K 7/0039* (2013.01); *G06K 7/0043* (2013.01); *G06K 7/0052* (2013.01); *G06K 13/08* (2013.01); *G06K 13/085* (2013.01); *G06K 13/0812* (2013.01); *H04M 1/026* (2013.01); *H04M 2250/14* (2013.01)

(58) Field of Classification Search
USPC ....................................................... 455/558
See application file for complete search history.

(56) References Cited

U.S. PATENT DOCUMENTS

| | | | | |
|---|---|---|---|---|
| 6,062,887 | A | * 5/2000 | Schuster | G06K 7/0021 439/218 |
| 6,305,960 | B1 | * 10/2001 | Fan | G06K 7/0021 439/188 |
| 2010/0173527 | A1 | * 7/2010 | Zhou | G06K 19/07732 439/630 |
| 2014/0113495 | A1 | 4/2014 | Lim et al. | |

FOREIGN PATENT DOCUMENTS

| | | |
|---|---|---|
| CN | 103367950 A | 10/2013 |
| JP | 2015-005408 A | 1/2015 |
| JP | 2015-109182 A | 6/2015 |
| KR | 2012-0008750 A | 2/2012 |
| KR | 10-1361740 B1 | 2/2014 |

\* cited by examiner

CARD SOCKET, CARD CONNECTOR, AND MANUFACTURING METHOD THEREFOR

RELATED APPLICATIONS

This application is a national stage application of PCT Application No. PCT/KR2016/015557, filed Dec. 30, 2016, which claims priority to Korean Application No. 10-2015-0190642, filed Dec. 31, 2015, and Korean Application No. 10-2016-0027828, filed Mar. 8, 2016, all of which are incorporated herein by reference in their entireties.

TECHNICAL FIELD

The present disclosure relates to a card socket for electrically connecting an electronic card to a substrate of an electronic device and a manufacturing method therefor. Further, the present disclosure relates to a card connector including such a card socket.

BACKGROUND ART

A subscriber identification module (SIM) card containing subscriber identification information is typically used in an electronic device such as a mobile phone or the like. In addition, a secure digital (SD) card or the like is used in such an electronic device as a memory card for storing data. Such an SD card or a SIM card is typically loaded onto a card tray, and the SD card or the SIM card loaded onto the card tray may be electrically connected to the electronic device by inserting the card tray into a card socket.

As electronic devices become miniaturized in recent years, a card tray capable of loading a plurality of electronic cards is suggested in the related art, and a card tray having an SD card and a SIM card loaded thereonto in a stacking manner is suggested as an example thereof.

However, in the related-art card tray onto which the SD card and the SIM card are loaded in the stacking manner, when the SD card and the SIM card are loaded onto the card tray to have a terminal unit of the SD card and a terminal unit of the SIM card face in the same direction, the card socket into which such a card tray is inserted should have a contact terminal for being brought into contact with the terminal unit of the SD card and a contact terminal for being brought into contact with the terminal unit of the SIM card disposed on the same plane of the card socket (for example, a lower surface of the card socket) without overlapping each other. To this end, it is difficult to make the area of the lower surface of the card socket small and thus it is difficult to miniaturize the card socket.

In addition, in the related-art card tray onto which the SD card and the SIM card are loaded in the stacking manner, when the SD card and the SIM card are loaded onto the card tray to have the terminal unit of the SD card and the terminal unit of the SIM card face in different directions, the card socket into which such a card tray is inserted should have a contact terminal for being brought into contact with the terminal unit of the SD card and a contact terminal for being brought into contact with the terminal unit of the SIM card disposed on opposite planes of the card socket (for example, an upper surface and a lower surface of the card socket), respectively. To this end, it is difficult to make the thickness of the card socket small and thus there is a limit to miniaturizing the card socket.

Meanwhile, Japanese Laid-Open Patent Publication No. 2015-109182 suggests a card socket employing a card tray having an SD card and a SIM card loaded thereonto in a stacking manner. The card socket suggested in the above-mentioned document includes an upper shell, an upper housing provided with an upper contact terminal, a lower housing provided with a lower contact terminal, and a lower shell. When such a card socket is manufactured, the upper housing and the lower housing are assembled with each other and the upper shell and the lower shell are assembled with the upper housing and the lower housing, respectively. However, the upper housing and the lower housing are manufactured by nonconductive synthetic resin having relatively low strength. Therefore, when the card tray is abnormally inserted into the card socket and is brought into contact with the upper housing or lower housing of the card socket, the upper housing and the lower housing assembled with each other may be disassembled from each other or the upper housing or the lower housing may be deformed by the force pushing the card tray into the card socket. That is, the card socket may be unexpectedly damaged due to wrong insertion of the card tray and thus it is difficult to guarantee stable performance of the card socket.

Patent Document 1: Japanese Laid-Open Patent Publication No. 2015-109182

SUMMARY

The present disclosure provides a card socket into which a card tray capable of loading a plurality of electronic cards is inserted, and which can be easily miniaturized and can reduce risk of damage caused by wrong insertion of the card tray.

In addition, the present disclosure provides a card connector including such a card socket and a card tray employed in the card socket.

In addition, the present disclosure provides a method for manufacturing a card socket, which can easily manage an assembly tolerance and easily manufacture a card socket.

One aspect of the present disclosure provides a card socket for electrically connecting a card provided with a terminal unit to an electronic device. According to an exemplary embodiment, a card socket includes: a conductive shell; a nonconductive middle plate; an upper contact terminal; and a lower housing provided with a lower contact terminal, and the upper contact terminal is integrally coupled to the shell with the middle plate being interposed therebetween, and the shell is coupled to the lower housing to form therein an accommodation space in which at least one card is accommodated.

In one embodiment, the shell includes a shell base portion and at least one shell sidewall portion which extends downward from an edge of the shell base portion, and the middle plate is disposed on a lower surface of the shell base portion, spaced apart from the shell sidewall portion to an inside by a predetermined distance.

In one embodiment, the lower housing includes a housing base portion and at least one housing sidewall portion which extends upward from an edge of the housing base portion, and the shell sidewall portion and the housing sidewall portion face each other when the shell and the lower housing are coupled to each other.

In one embodiment, at least one locking projection is provided on an outside of the sidewall portion of the lower housing, and at least one locking groove corresponding to the locking projection is provided on the shell sidewall portion, and the locking projection is fitted into the locking groove such that the shell is coupled to the lower housing.

In one embodiment, the middle plate is insert molded between the shell and the upper contact terminal.

In one embodiment, the middle plate is insert molded into the upper contact terminal, and a portion of the upper contact terminal that is not electrically connected with the terminal unit of the card is laser welded onto the shell.

In one embodiment, the card socket includes an opening to allow one or more cards to be inserted therethrough, and an edge of the shell bends at the opening as much as a thickness of the middle plate in the shape of letter L.

In one embodiment, the lower contact terminal includes a first lower contact terminal and a second lower contact terminal which are disposed consecutively in an insertion direction of the card, and the upper contact terminal is disposed to face a portion of the first lower contact terminal and a portion of the second lower contact terminal.

In one embodiment, a hole is formed on the shell to correspond to a downward protrusion of the upper contact terminal.

Another aspect of the present disclosure provides a card connector. According to an exemplary embodiment, a card connector further includes the above-described card socket and a card tray removably inserted into the accommodation space of the card socket, and the card tray includes a seating portion of a plate shape and a cover portion formed at one end of the seating portion, and a first concave portion is provided on one surface of the seating portion to have a first card seated thereon, and at least one second concave portion is provided on the other surface of the seating portion to have at least one second card seated thereon.

In one embodiment, a third concave portion is further provided on the first concave portion adjacent to the cover portion, and the third concave portion is positioned deviating from the second concave portion in a thickness direction of the seating portion.

In one embodiment, the card connector includes a projection protruding from at least one side surface portion of the second concave portion.

Still another aspect of the present disclosure provides a method for manufacturing a card socket described above. According to an exemplary embodiment, there is provided a method for manufacturing a card socket which includes a conductive shell, an upper contact terminal, a nonconductive middle plate, and a lower housing provided with a lower contact terminal, and in which the upper contact terminal is integrally coupled to the shell by the middle plate, the method including the steps of: molding the upper contact terminal and the shell; integrally coupling the upper contact terminal to the shell with the middle plate being interposed therebetween; molding the lower housing provided with the lower contact terminal; and coupling the shell and the lower housing to each other. The step of integrally coupling the upper contact terminal to the shell with the middle plate being interposed therebetween includes a step of insert molding the middle plate between the shell and the upper contact terminal.

In one embodiment, the step of integrally coupling the upper contact terminal to the shell with the middle plate being interposed therebetween includes a step of insert molding the middle plate into the upper contact terminal, and laser welding a portion of the upper contact terminal that is not electrically connected with a terminal unit of a card onto the shell.

In one embodiment, the shell and the upper contact terminal include frame portions connected thereto by at least one carrier bridge, respectively, and, in the step of integrally coupling the upper contact terminal to the shell with the middle plate being interposed therebetween, the carrier bridge of the shell and the carrier bridge of the upper contact terminal are disposed horizontally spaced apart from each other.

According to an embodiment, the card socket can be easily miniaturized by employing the nonconductive middle plate in the card socket instead of an upper housing in a related-art card socket. In addition, coupling strength of the card socket is reinforced by employing the nonconductive middle plate, such that the risk of damage to the card socket can be reduced even when the card tray is wrongly inserted. In addition, since the upper contact terminal is integrally coupled to the conductive shell by the nonconductive middle plate, flatness of a soldering portion of the upper contact terminal can be enhanced. In addition, not only a tolerance of an individual component, but also distribution of a whole size of the card socket can easily managed by reducing the number of components constituting the card socket, and the time required to assembly the card socket can be reduced and thus manufacturing productivity of the card socket can be enhanced.

DETAILED DESCRIPTION OF THE PREFERRED EMBODIMENTS

Figure 1:
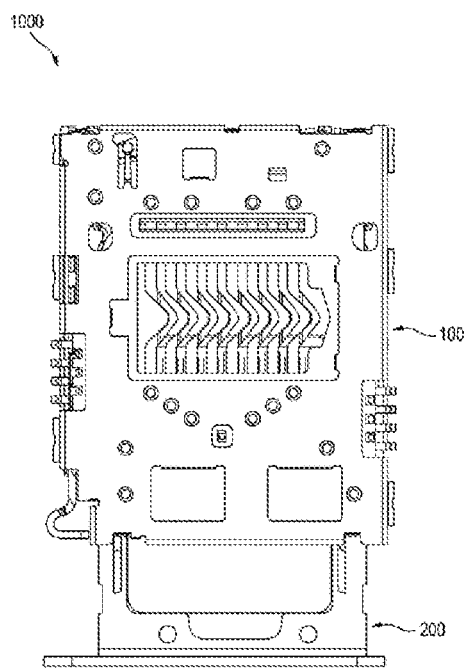
FIG. 1 is a plane view showing a card connector according to one embodiment of the present disclosure.

Hereinafter, embodiments of a card socket, a card connector, and a method for manufacturing a card socket according to the present disclosure will be described with reference to the accompanying drawings. In the drawings, the same reference numerals indicate the same or corresponding elements or components.

Figure 2:
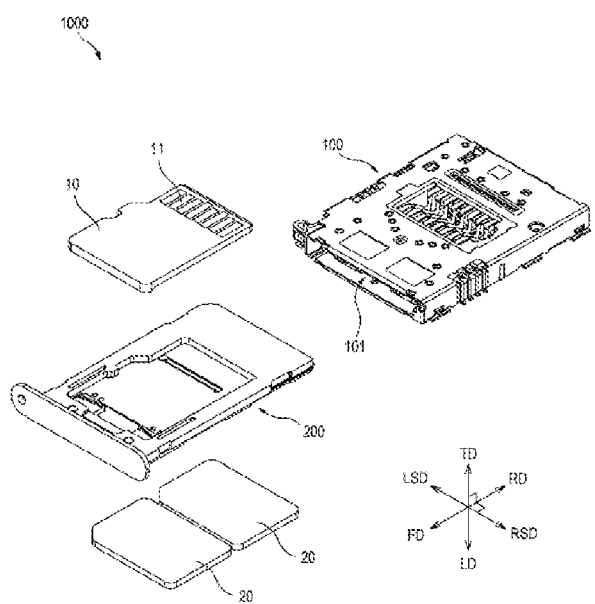
FIG. 2 is a perspective view showing the card connector shown in FIG. 1, in which a card tray, a first card, and a second card are separated from a card socket.
Figure 11:
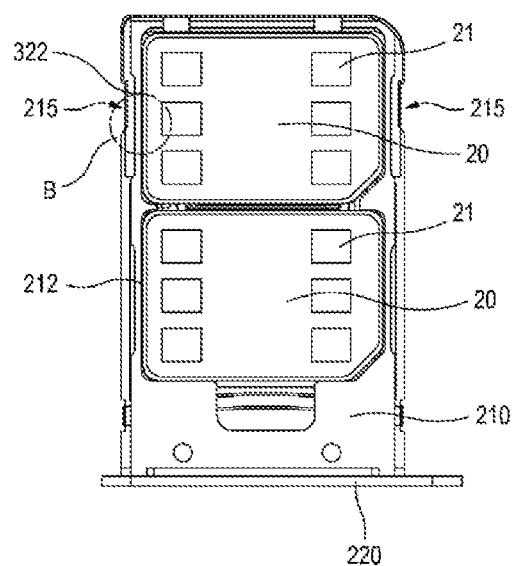
FIG. 11 is a bottom view of a card tray according to one embodiment of the present disclosure, onto which a second card is loaded.

Referring to FIGS. 1 and 2, a card connector 1000 of one embodiment includes a card socket 100 and a card tray 200 which is removably inserted into the card socket 100. The card tray 200 of one embodiment is a card tray that has a plurality of electronic cards loaded thereonto in a stacking manner, and a plurality of electronic cards are inserted into and loaded onto the card tray 200 in both directions [that is, a vertical direction (TD/LD) in FIG. 2] to face one another. In one embodiment, the plurality of cards loaded onto the card tray 200 include one first card 10 and two second cards 20, and the first card 10 is a micro SD card and the second card 20 is a nano SIM card. A terminal unit 11 of the first card 10 loaded onto the card tray 200 and a terminal unit 21 (see FIG. 11) of the second card 20 face in outside directions opposite to each other [for example, when the card tray 200 is placed in parallel with the ground surface, the first card 10 is loaded onto the card tray 200 so as to have the terminal unit 11 face upward (TD), and the second card 20 is loaded onto the card tray 200 so as to have the terminal unit 21 face downward (LD)].

Figure 3:
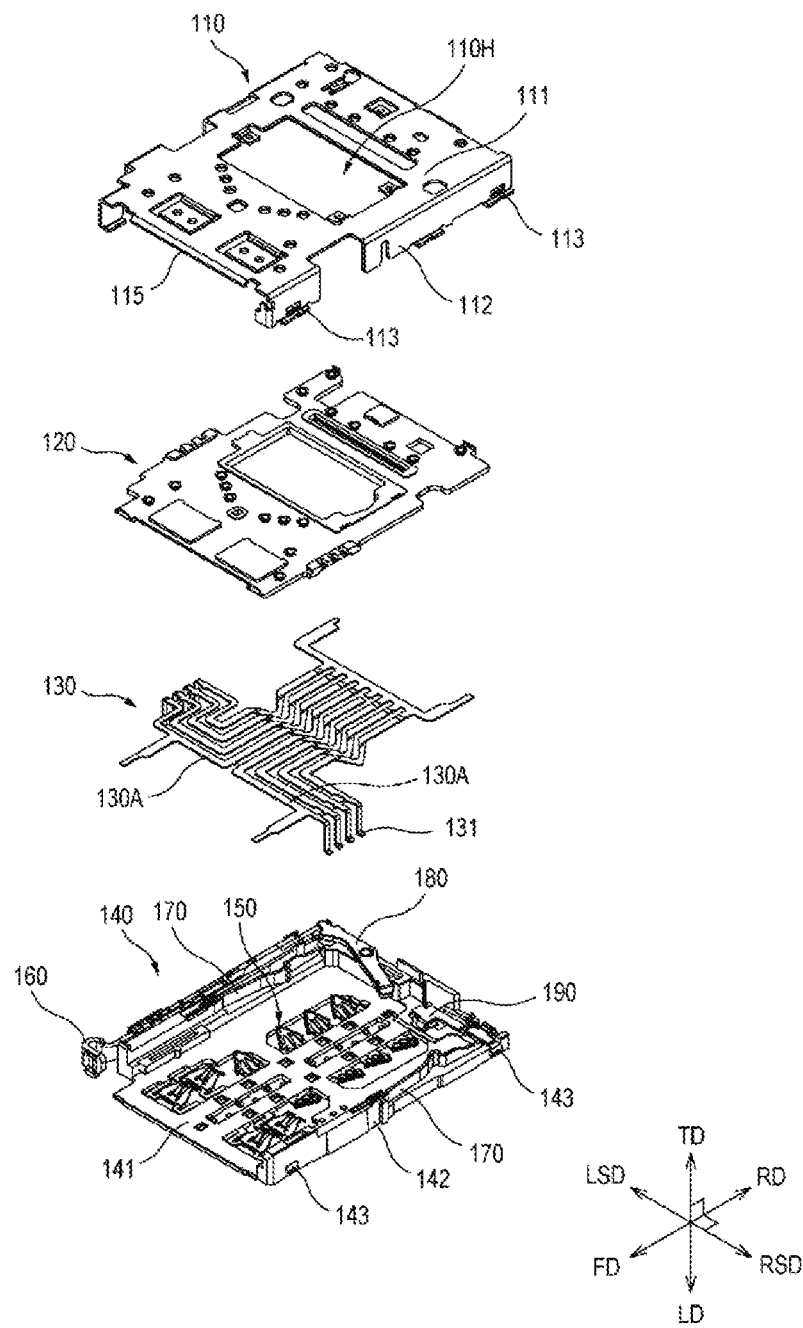
FIG. 3 is an exploded perspective view of a card socket according to one embodiment of the present disclosure.

Referring to FIG. 3, the card socket 100 of one embodiment includes a conductive shell 110 (for example, a metal shell), a nonconductive middle plate 120 (for example, a middle plate of synthetic resin), an upper contact terminal 130 for being brought into contact with the terminal unit 11 of the first card 10, and a lower housing 140. The lower housing 140 is provided with a lower contact terminal 150 for being brought into contact with the terminal unit 21 of the second card 20.

Since the first card 10 and the second card 20 are loaded onto the card tray 200 of one embodiment so as to have both the terminal unit 11 of the first card 10 and the terminal unit 21 of the second card 20 face outside, the upper contact terminal 130 for being brought into contact with the terminal unit 11 of the first card 10 is disposed in an upper portion of an inside of the card socket 100 so as to face downward (LD), and the lower contact terminal 150 for being brought into contact with the terminal unit 21 of the second card 20 is disposed in a lower portion of the inside of the card socket 100 so as to face upward (TD). When the card socket 100 is viewed from the top (TD) or from the bottom (LD), a region where the upper contact terminal 130 is disposed and a region where the lower contact terminal 150 is disposed may overlap each other at least in part. Accordingly, in comparison to a related-art card socket in which a plurality of contact terminals are provided on the same plane, space utilization in the card socket 100 increases and thus it is easy to miniaturize the card socket.

In the card socket 100 of one embodiment, the nonconductive middle plate 120 is insert molded between the conductive shell 110 and the upper contact terminal 130, such that the upper contact terminal 130 is integrally coupled to the conductive shell 110 by the nonconductive middle plate 120. The upper contact terminal 130 includes a portion that is not electrically connected with the terminal unit 11 of the first card 10 even when the upper contact terminal 130 is brought into contact with the terminal unit 11 of the first card 10, for example, a dummy contact terminal 130A. In one embodiment, the conductive shell 110, the nonconductive middle plate 120, and the upper contact terminal 130 are integrally formed with one another at a time by insert molding of the nonconductive middle plate 120, but this should not be considered as limiting. That is, as in another embodiment, the nonconductive middle plate 120 may be insert molded into the upper contact terminal 130 and then the dummy contact terminal 130A of the upper contact terminal 130 may be laser welded to the conductive shell 110. In this case, the upper contact terminal 130 is integrally coupled to the conductive shell 110 with the nonconductive middle plate 120 being at least interposed between the upper contact terminal 130 and the conductive shell 110. Herein, the nonconductive middle plate 120 being at least interposed between the conductive shell 110 and the upper contact terminal 130 includes not only the insert-molded nonconductive middle plate 120 being inserted between the conductive shell 110 and the upper contact terminal 130, but also a portion of the nonconductive middle plate 120 covering a portion of a surface of the upper contact terminal 130 facing downward (LD).

Meanwhile, the lower contact terminal 150 is insert molded into the lower housing 140.

As described above, the conductive shell 110 is electrically disconnected from the upper contact terminal 130, and also, the upper contact terminal 130 is integrally coupled to the conductive shell 110 through the nonconductive middle plate 120. Accordingly, in comparison to a related-art card socket in which a conductive shell is simply fitted into an outside of a nonconductive housing, entire strength of the card socket 100 can be enhanced. In addition, in one embodiment, the conductive shell 110 of the card socket 100 may have a hole 110H penetrating through the center thereof in order to prevent a short-circuit in a driving unit (a contact portion for electrically connecting with the terminal unit 11 of the first card 10) of the upper contact terminal 130.

In a surface mounting technology (SMT) process for soldering the card socket 100 onto a substrate of an electronic device, the upper contact terminal 130 of the card socket 100 is exposed to high temperature of about 260° C. In one embodiment, the nonconductive middle plate 120 is integrally coupled to the conductive shell 110 which is made of metal having tensile strength ten times higher than that of synthetic resin. Therefore, even when heat is transmitted from the upper contact terminal 130 to the nonconductive middle plate 120 formed of synthetic resin in the process of soldering the card socket 100 onto the substrate of the electronic device, thermal deformation is not easily generated. Accordingly, flatness of a soldering portion 131 which is a substrate soldering portion positioned at a distal end of the upper contact terminal 130 can be prevented from being degraded, and a soldering defect can be prevented. That is, in the card socket 100 of one embodiment, the nonconductive middle plate 120 is integrally coupled to the conductive shell 110 formed of a metal material, such that there are effects that bending can be prevented from occurring due to thermal deformation of the nonconductive middle plate 120 and flatness of the soldering portion 131 can be enhanced.

The conductive shell 110 of one embodiment includes a shell base portion 111 and shell sidewall portions 112 which extend downward from both edges of the shell base portion 111. The lower housing 140 includes a housing base portion 141 and housing sidewall portions 142 which extend upward from both edges of the housing base portion 141. The conductive shell 110 (specifically, the conductive shell 110 integrally formed with the nonconductive middle plate 120 and the upper contact terminal 130) has an opening 101 opened to one side so as to be coupled to the lower housing 140 and to allow the card tray 200 to be inserted therethrough, and has an accommodation space formed in an inner space formed by the conductive shell 110 and the lower housing 140 to accommodate the card tray 200.

In one embodiment, as shown in FIG. 3, at least one locking projection 143 is formed on the housing sidewall portion 142 of the lower housing 140 to protrude outward (a leftward direction (LSD) and a rightward direction (RSD)), and at least one locking groove 113 corresponding to the locking projection 143 is formed on the shell sidewall portion 112 of the conductive shell 110. When the conductive shell 110 and the lower housing 140 are coupled to each other, the locking projection 143 of the lower housing 140 is fitted into the locking groove 113 of the conductive shell 110 (for example, snap-fit).

Figure 4:
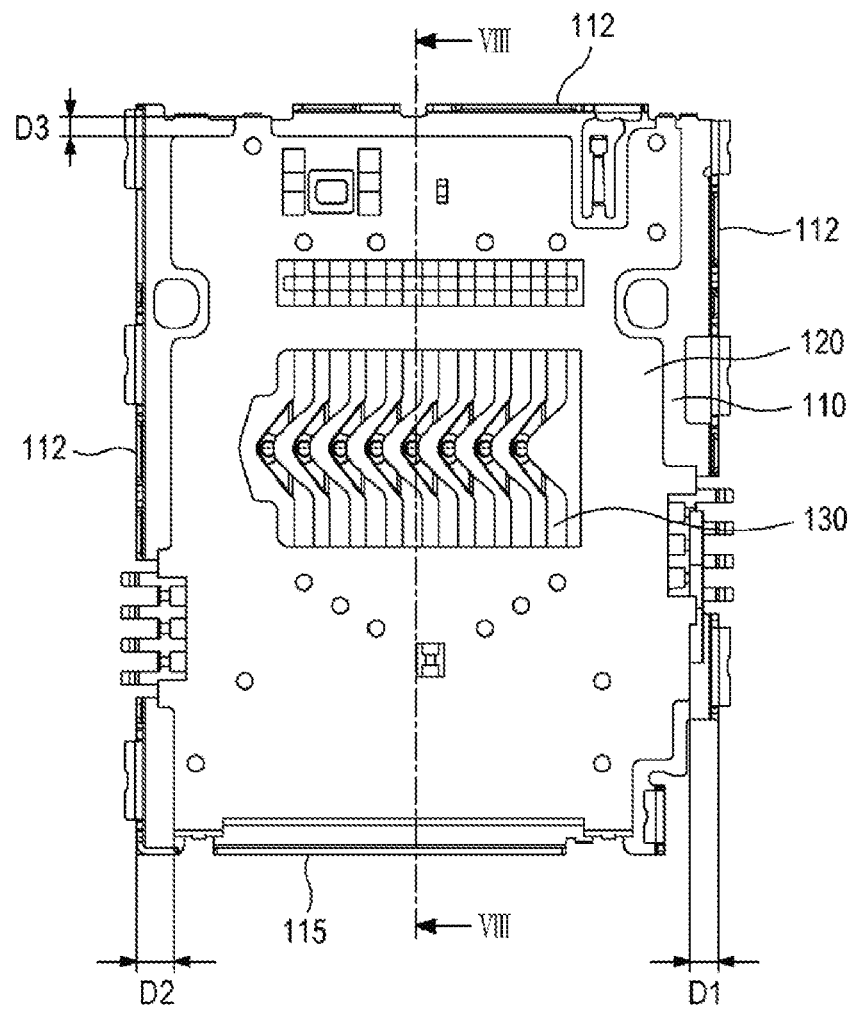
FIG. 4 is a bottom view showing an upper contact terminal, a nonconductive middle plate, and a conductive shell which are integrally coupled to one another in a card socket according to one embodiment of the present disclosure.
Figure 5:
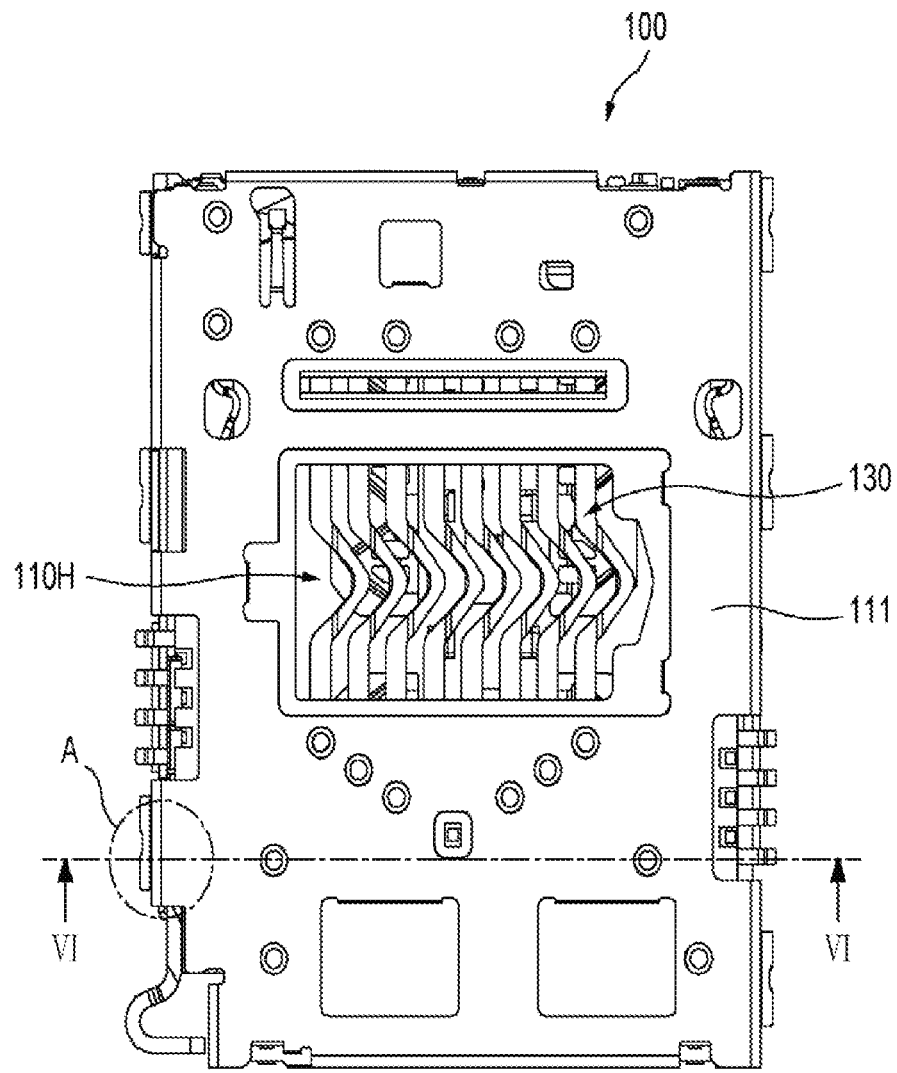
FIG. 5 is a plane view showing the upper contact terminal, the nonconductive middle plate, and the conductive shell which are integrally coupled to one another as illustrated in FIG. 4.
Figure 7:
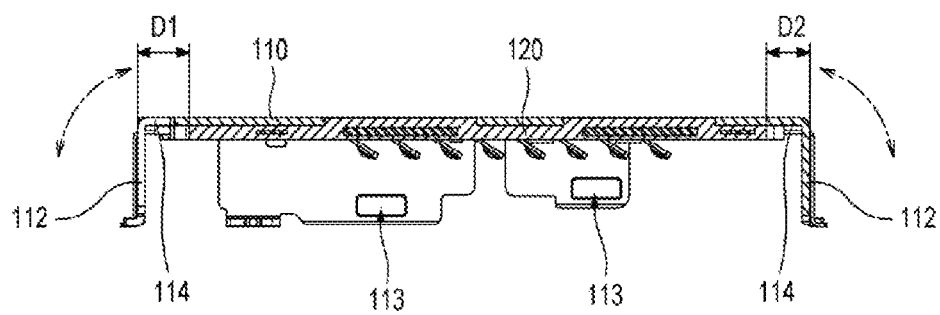
FIG. 7 is a view showing the upper contact terminal, the nonconductive middle plate, and the conductive shell which are integrally coupled to one another in the cross section of the card socket taken on line VI-VI of FIG. 5.

Referring to FIG. 4, the nonconductive middle plate 120 is positioned spaced apart from the shell sidewall portion 112 of the conductive shell 110 to the inside by predetermined distances D1, D2, and D3, rather than being integrally formed with the entirety of the lower surface of the conductive shell 110 (specifically, rather than being insert molded into the conductive shell 110 so as to cover an entire surface (lower surface) of the shell base portion 111 of the conductive shell 110 facing downward (LD)). As shown in FIG. 7, the conductive shell 110 includes a portion which is formed inside the shell sidewall portion 112 and into which the nonconductive middle plate 120 is not insert molded, that is, a free end 114. Accordingly, strength of the upper surface of the card socket 100 can be greatly enhanced by coupling the conductive shell 110 and the nonconductive middle plate 120, while an elastic restoring force of the conductive shell 110 (an elastic restoring force for coupling to/decoupling from the lower housing 140) can be prevented from being reduced by insert molding of the nonconductive middle plate 120. That is, when the conductive shell 110 is coupled to the lower housing 140, plastic deformation of the conductive shell 110 can be prevented, and the locking projection 143 of the lower housing 140 can be prevented from being easily released from the locking groove 113 of the conductive shell 110.

Figure 6:
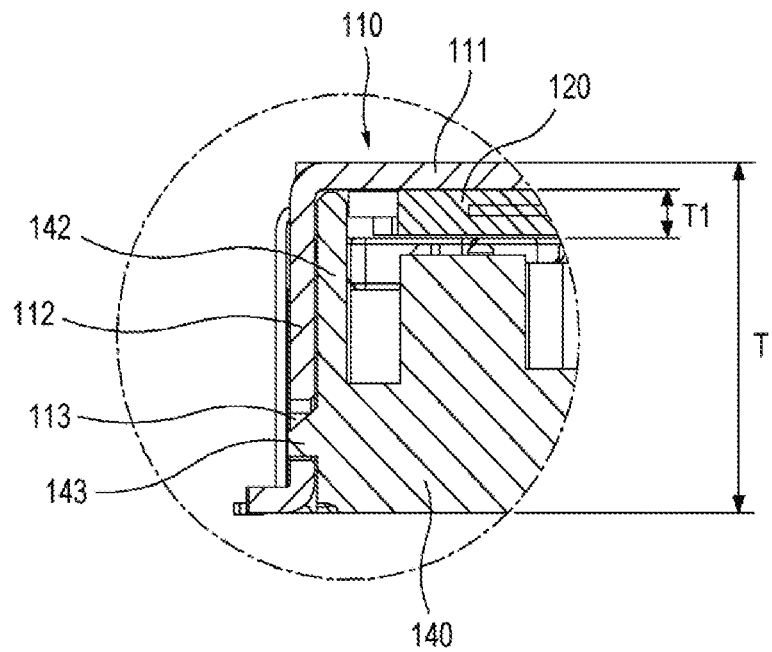
FIG. 6 is a view showing a portion A shown in FIG. 5 in a cross section of the card socket taken on line VI-VI of FIG. 5.

Meanwhile, since the nonconductive middle plate 120 is disposed spaced apart from the shell sidewall portion 112 of the conductive shell 110 to the inside by the predetermined distances D1, D2, and D3, the housing sidewall portion 142 of the lower housing 140 is brought into direct contact with the shell base portion 111 of the conductive shell 110 when the conductive shell 110 and the lower housing 140 are coupled to each other, as shown in FIG. 6. That is, the conductive shell 110 is coupled to the lower housing 140 without interposing the nonconductive middle plate 120 at an edge portion of the card socket 100, such that a total thickness (T) of the card socket 100 can be reduced. For example, the thickness of the card socket 100 can be reduced as much as a thickness (T1) (for example, about 0.35 mm) of the nonconductive middle plate 120. In addition, a manufacturing assembly tolerance regarding a thickness and bending/flatness of the conductive shell 110 can be reduced by reducing the number of components stacked in a thickness direction of the card socket 100. In addition, since the manufacturing assembly tolerance in the thickness direction of the card socket 100 can be reduced, clearance fit can be prevented when the conductive shell 110 and the lower housing 140 are coupled to each other, and thus assembly coupling strength of the card socket 100 can be reinforced.

Figure 8:
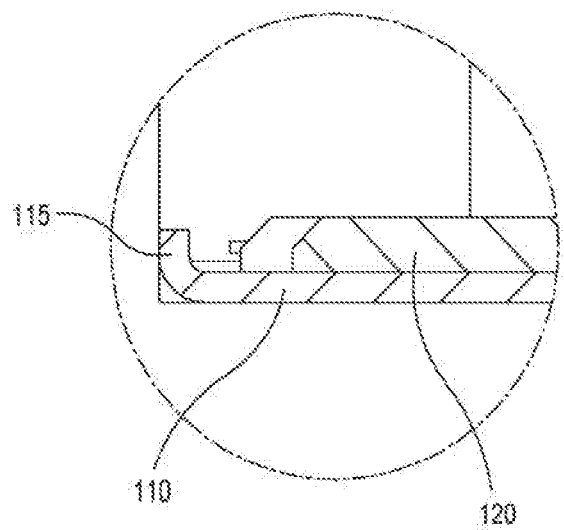
FIG. 8 is a view showing a portion of a cross section of the card socket taken on line VIII-VIII of FIG. 4.

In the card socket 100, a bending portion 115 which bends downward approximately as much as the thickness of the nonconductive middle plate 120 in the shape of letter L is formed at an edge of an upper side of the opening 101 (an edge formed by the shell base portion 111 of the conductive shell 110) as shown in FIG. 8. Structural strength of the conductive shell 110 is reinforced by such a bending shape of the opening 101 of the conductive shell 110, that is, the bending portion 115, such that bending of the conductive shell 110 can be prevented, and damage to the card socket 100 can be prevented even when the card tray 200 is wrongly inserted and collides with the opening 101.

Figure 9:
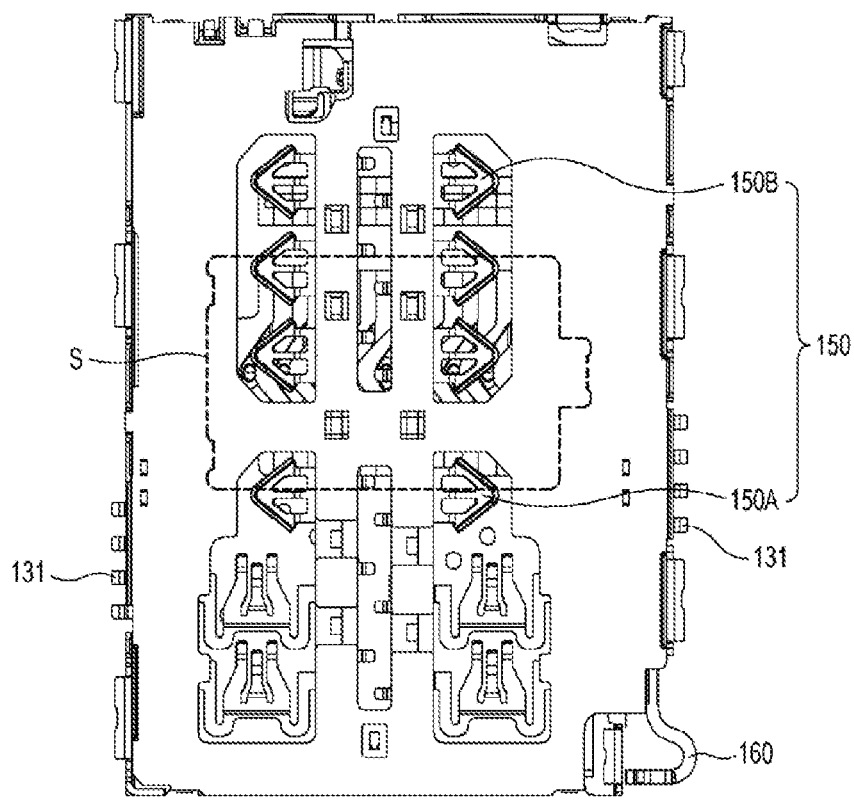
FIG. 9 is a bottom view of a card socket according to one embodiment of the present disclosure.
Figure 10:
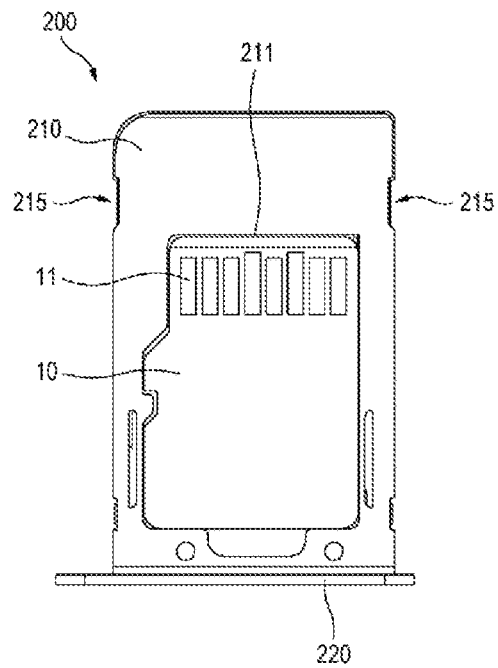
FIG. 10 is a plane view of a card tray according to one embodiment of the present disclosure, onto which a first card is loaded.

In one embodiment, the card socket 100 includes, as the lower contact terminal 150, a first lower contact terminal 150A and a second lower contact terminal 150B which are disposed on the lower housing 140 in sequence in a direction in which the card tray 200 is inserted from the opening 101. The card tray 200 onto which one second card 20 is loaded may be inserted into the card socket 100. The card socket 100 of one embodiment has a structure in which, when the card tray 200 having one or two second cards 20 loaded thereonto without having the first card 10 is inserted into the card socket 100, the second card 20 loaded onto the card tray 200 is brought into contact with the corresponding lower contact terminal [the first lower contact terminal 150A and/or the second lower contact terminal 150B], and accordingly, the card tray 200 is not deformed and is stably in contact with the lower contact terminal 150 even when an upwardly pushing force is exerted. To achieve this, in the card socket 100, a portion of the upper contact terminal 130 which bends downward so as to be brought into contact with the terminal unit 11 of the first card 10 is disposed to face a region (S) (see FIG. 9) including a region between the first lower contact terminal 150A and the second lower contact terminal 150B. The region (S) faces the hole 110H formed on the shell base portion 111 of the conductive shell 110. Even when one or two second cards 20 are loaded onto the card tray 200 and are inserted into the card socket 100, the upper contact terminal 130 can prevent deformation (for example, a swelling phenomenon) of the card tray 200 (in particular, a portion of the card tray 200 on which the first card 10 and the second card 20 are inserted and seated), and can prevent loose contact between the second card 20 and the lower contact terminal 150 due to the arrangement of the upper contact terminal 130 and the lower contact terminal 150 described above.

The card socket 100 of one embodiment further includes a push bar 160, a latch bar 170, a hinge bar 180, and a detection switch 190 which are mounted in the lower housing 140. When the card tray 200 is inserted into the card socket 100, a pair of latch bars 170 are deformed to be pressed by the card tray 200 and are locked into concave recesses 215 formed at both sides of the card tray 200, thereby fixing the card tray 200 to the accommodation space formed inside the card socket 100. The push bar 160 is to separate the card tray 200 inserted into the card socket 100, and, when a draw-out pin (not shown) is inserted into an outlet opening 221 formed on a cover portion 220 of the card tray 200 and is pressed, the push bar 160 moves back in the insertion direction of the card tray 200 in the card socket 100 and rotates the hinge bar 180 coupled thereto to be interlocked. The hinge bar 180 rotated by the push bar 160 pushes the card tray 200 toward the opening 101 so as to allow the card tray 200 to be drawn out from the card socket 100. The hinge bar 180 rotated to push the card tray 200 toward the opening 101 is pushed by the card tray 200 and returns to its previous state when the card tray 200 is inserted into the card socket 100 again, and the push bar 160 interlocked with the hinge bar 180 returns to its previous state, that is, a state in which it can be pressed in the insertion direction of the card tray 200. The detection switch 190 has a structure in which a portion thereof is pushed by the card tray 200 and is released from contact with another portion, or is brought into contact with another portion, and detects whether the card tray 200 is inserted according to whether it is brought into contact with another portion. The detection switch 190 may be provided with a pin (not shown) soldered to the substrate, and may transmit a detected signal to a component mounted on the substrate to form a circuit.

In one embodiment, the conductive shell 110, the push bar 160, the latch bar 170, and the hinge bar 180 may be formed of stainless steel having strong durability, such as STS 340 or the like, and the upper contact terminal 130, the lower contact terminal 150, and the detection switch 190 may be formed of a copper alloy having excellent conductivity. In addition, the nonconductive middle plate 120 and the lower housing 140 may be formed of a synthetic resin material, and the synthetic resin includes liquid-crystal polyester.

Referring to FIGS. 10 to 13, the card tray 200 of one embodiment includes a seating portion 210 of a plate shape and the cover portion 220 which is formed at one end of the seating portion 210 (an end of the card tray 200 facing outside when the card tray 200 is inserted into the card socket 100). The card tray 200 is provided with a first concave portion 211 formed on one surface (upper surface) of the seating portion 210 to allow the first card 10 to be seated thereon, and is provided with a second concave portion 212 formed on the other surface of the seating portion 210 opposite to one surface of the seating portion 210 to allow the second card 20 to be seated thereon. In one embodiment, one first concave portion 211 is provided on one surface of the seating portion 210 and two second concave portions 212 are provided on the other surface of the seating portion 210. However, this should not be considered as limiting, and the number of the first concave portion 211 and the number of the second concave portion 212 may vary according to the number of electronic cards loaded onto the card tray 200. When the first card 10 and the second card 20 are loaded onto such a card tray 200, the first card 10 is inserted into and seated on the first concave portion 211 so as to have its terminal unit 11 face outside (for example, upward), and the second card 20 is inserted into and seated on the second concave portion 212 so as to have its terminal unit 21 face outside (for example, upward), that is, opposite to the facing direction of the terminal unit 11 of the first card 10.

In the card socket employing a card tray having a plurality of electronic cards loaded thereonto in a stacking manner, like the card tray 200 of one embodiment, a middle partition for dividing a space formed in the card socket to allow the plurality of electronic cards to be inserted is not required. Therefore, for example, a damage problem of the middle partition that may be caused by wrong insertion of an electronic card into the card socket having the middle partition can be fundamentally prevented.

Figure 12:
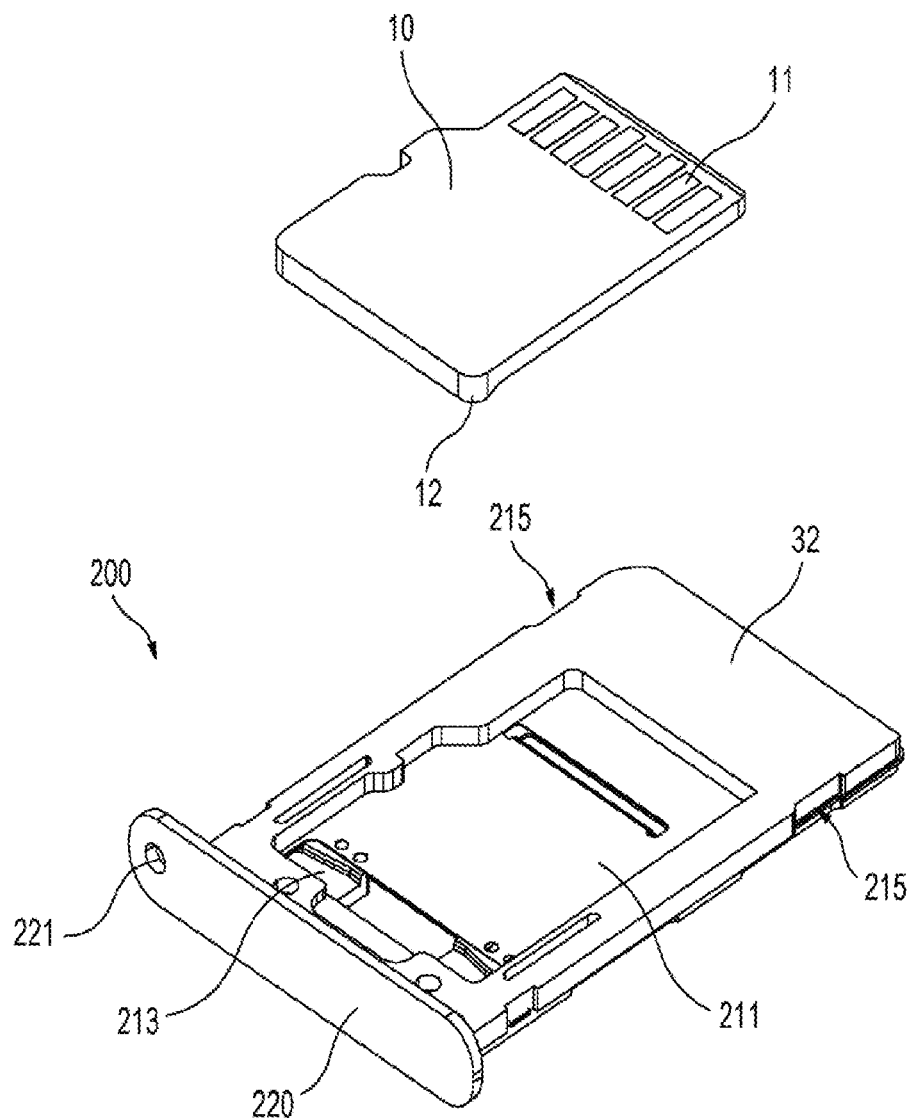
FIG. 12 is an exploded perspective view showing a card tray according to one embodiment of the present disclosure and a first card loaded onto such a card tray.
Figure 13:
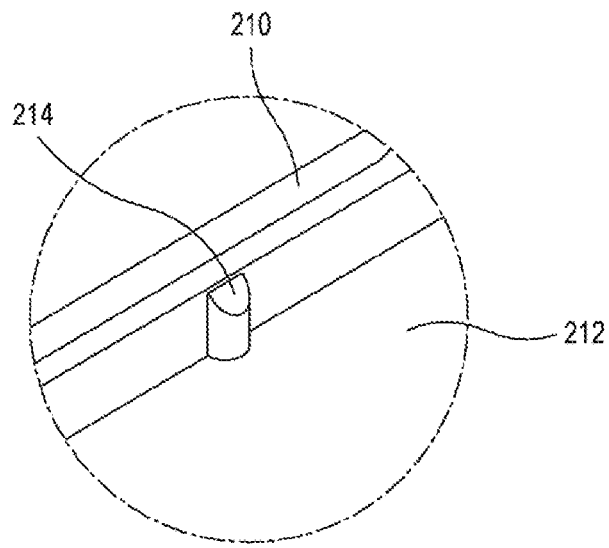
FIG. 13 is a view showing a projection portion of the card tray which is formed on a portion B shown in FIG. 11.

The first card 10 includes a protrusion 12 for a card handle formed at one end thereof and having a thickness thicker than an average thickness of the first card 10. In one embodiment, a third concave portion 213 corresponding to the shape of the protrusion 12 for the card handle is formed in the first concave portion 211 of the seating portion 210 of the card tray 200 as shown in FIG. 12, such that the protrusion 12 for the card handle of the first card 10 is inserted into the third concave portion 213 when the first card 10 is inserted and seated, and the first card 10 is seated on the first seating portion 210 without being inclined. In one embodiment, in order to prevent the thickness of the seating portion 210 from being thicker due to the third concave portion 213 formed in the first concave portion 211, the third concave portion 213 may be formed on a portion of the first concave portion 211 adjacent to the cover portion 220 (a portion of the first concave portion 211 corresponding to a plane between the cover portion 220 and a side surface of the second concave portion 212 adjacent to the cover portion 220). In the seating portion 210 of the card tray 200, the first concave portion 211 further extends toward the cover portion 220 than the second concave portion 212 (see FIGS. 10 and 11). Accordingly, since the third concave portion 213 into which the protrusion 12 for the card handle of the first card 10 is inserted is not collinearly disposed on the card tray 200 with the second concave portion 212 into which the second card 20 is inserted in the thickness direction of the seating portion 210 (that is, since the third concave portion 213 is positioned deviating from the second concave portion 212 in the thickness direction of the seating portion 210), the thickness of the card tray 200 can be prevented from being thicker to simultaneously guarantee a dimension of the third concave portion 213 in the depth direction and a dimension of the second concave portion 212 in the depth direction.

One first card 10 and two second cards 20 are inserted into and loaded onto the card tray 200 in both directions (that is, in a vertical direction) to face each other, and the card tray 200 onto which the first card 10 and the second cards 20 are loaded is inserted into the card socket 100 with the second cards 20 facing downward. In one embodiment, a structure which prevents the second card 20 positioned under the card tray 200 from being arbitrarily released from the card tray 200 is further included. That is, referring to FIG. 13, the card tray 200 includes a projection 214 protruding from at least one side surface portion of the second concave portion 212. In one embodiment, the projection 214 protrudes from the side surface portion of the second concave portion 212 to have a length of about 0.25 mm to 0.3 mm, and a shape of a cross-section thereof parallel to the seating portion 210 has a substantially semicircular shape. The second card 20 inserted into and seated on the second concave portion 212 is pressed by the projection 214 at an edge, such that the second card 20 is loaded without being shaken in the second concave portion 212 and without being easily released from the card tray 200.

In the card tray 200, concave recesses 215 are formed at both edges of the seating portion 210 facing each other, respectively, to fix the card tray 200 inserted into the card socket 100. The card tray of one embodiment is manufactured by insert molding polycarbonate into a tray frame formed of an STS sheet.

Figure 14:
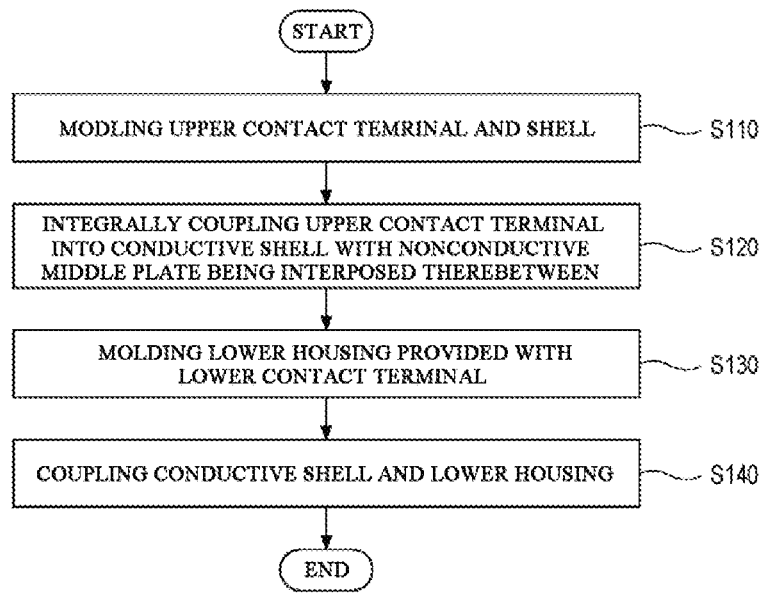
FIG. 14 is a sequence diagram showing a method for manufacturing a card socket according to one embodiment of the present disclosure.

Hereinafter, a method for manufacturing the card socket 100 according to one embodiment will be described with reference to FIG. 14. The method for manufacturing the card socket 100 according to one embodiment includes a step S110 of molding the upper contact terminal 130 and the conductive shell 110, respectively, a step S120 of integrally coupling the upper contact terminal 130 to the conductive shell 110 with the nonconductive middle plate 120 being interposed therebetween, a step S130 of molding the lower housing 140 provided with the lower contact terminal 150, and a step S140 of coupling the conductive shell 110 to which the upper contact terminal 130 and the nonconductive middle plate 120 are integrally coupled, and the lower housing 140 to each other.

Figure 15A:
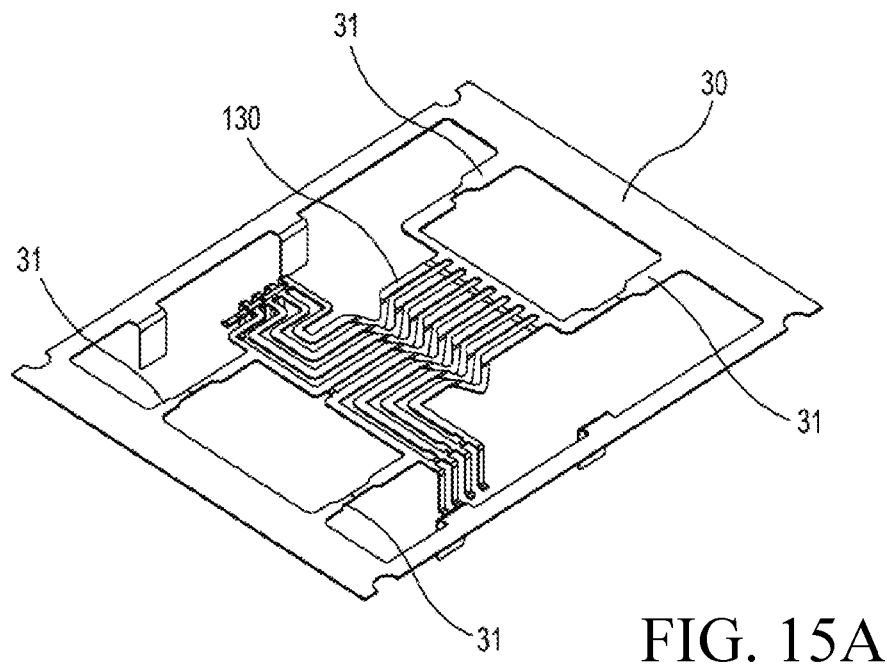
FIGS. 15A to 15E are reference views to explain a method for manufacturing a card socket according to one embodiment of the present disclosure.
Figure 15B:
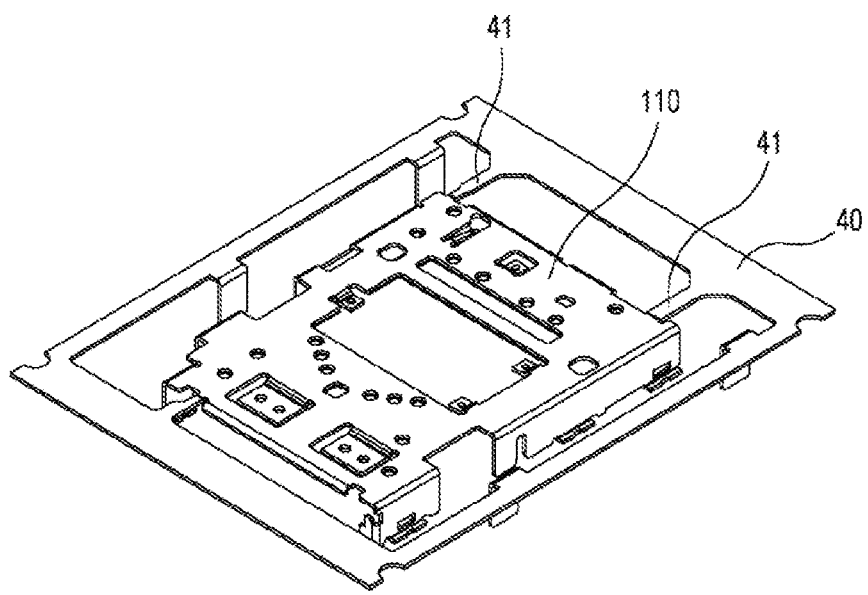

In the step S110 of molding the upper contact terminal 130 and the conductive shell 110, the upper contact terminal 130 and the conductive shell 110 are formed by a shaping process using a press, that is, a stamping process. Frame portions 30 and 40 are connected to the upper contact terminal 130 and the conductive shell 110 having shapes through the stamping process or the like, respectively, by a plurality of carrier bridges 31 and 41 (see FIGS. 15A and 15B). The frame portions 30 and 40 may be used to manufacture the card socket 100 in an automated manner, and the carrier bridges 31 and 41 may be selectively cut after the automation step finishes.

Figure 15C:
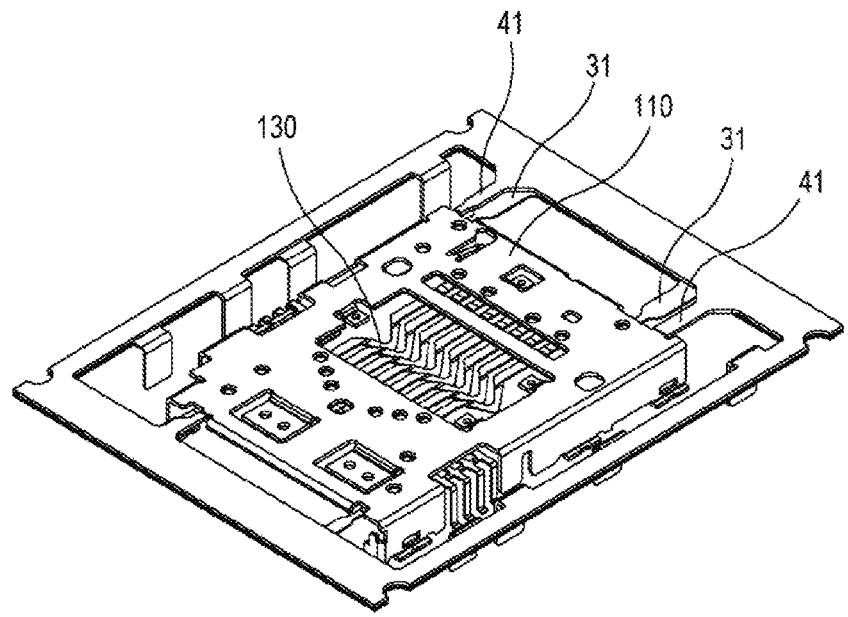
Figure 15D:
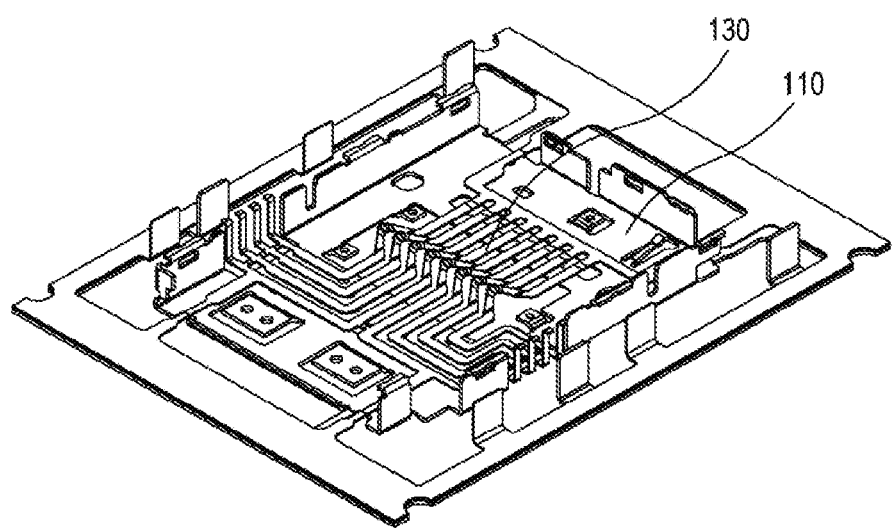
Figure 15E:
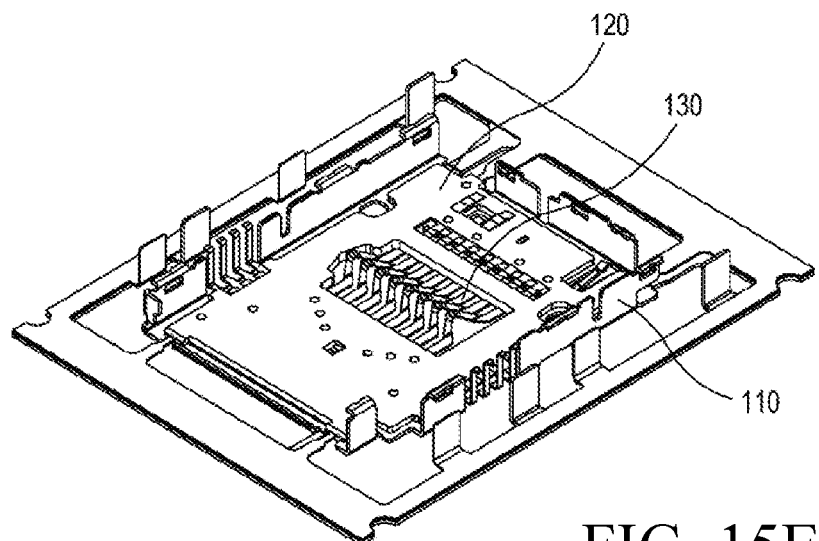

When the upper contact terminal 130 and the conductive shell 110 are prepared, the nonconductive middle plate 120 is insert molded between the upper contact terminal 130 and the conductive shell 110 which are layered one on another (see FIGS. 15C and 15D) by using an injection molding machine, such that the upper contact terminal 130, the conductive shell 110, and the nonconductive middle plate 120 are integrally coupled to one another (S120) (see FIG. 15E).

Figure 16A:
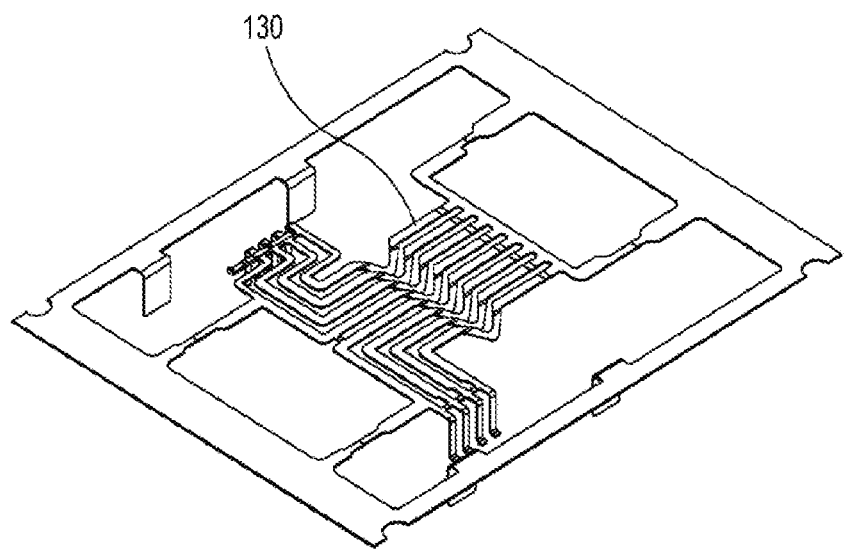
FIGS. 16A to 16E are reference views to explain a method for manufacturing a card socket according to another embodiment of the present disclosure.
Figure 16B:
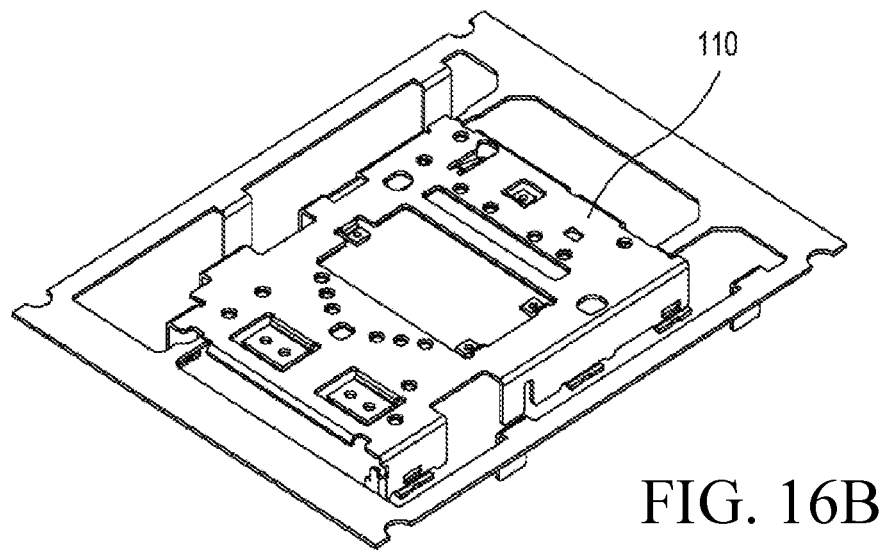
Figure 16C:
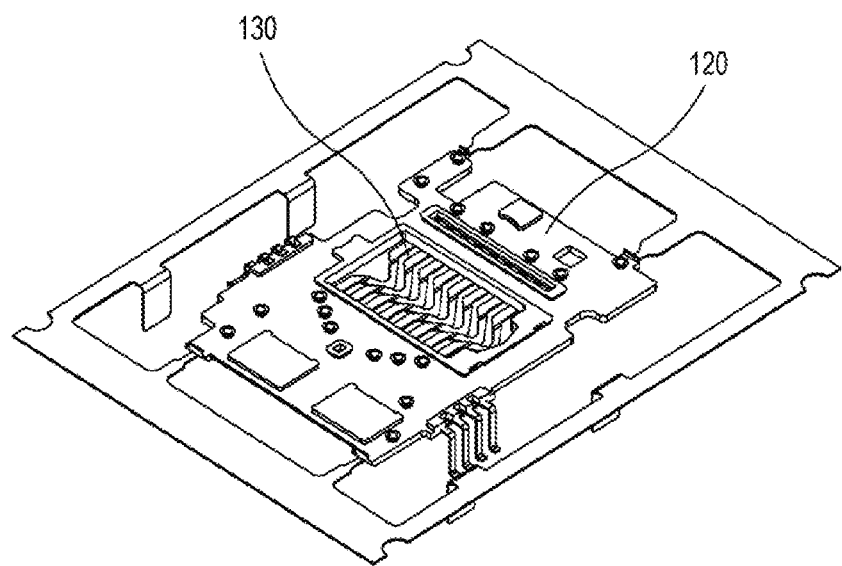
Figure 16D:
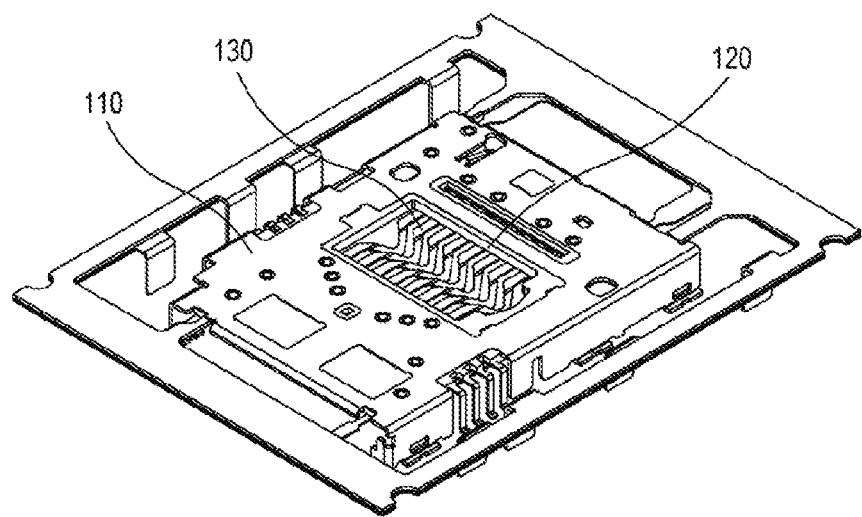
Figure 16E:
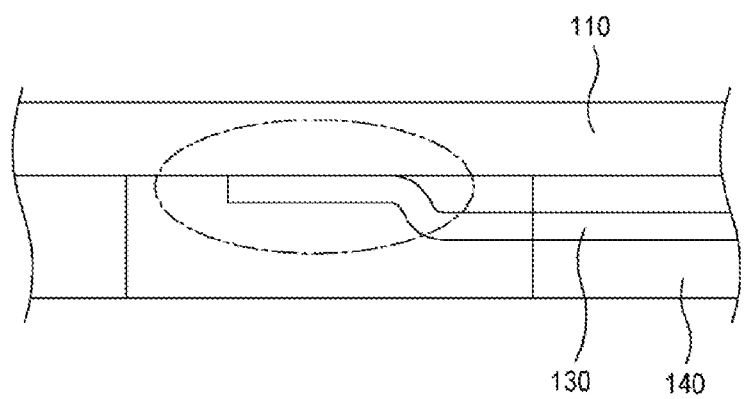

Although the upper contact terminal 130, the conductive shell 110, and the nonconductive middle plate 120 are coupled to one another at a time by insert molding in the manufacturing method of the card socket of one embodiment, in a method for manufacturing the card socket of another embodiment, two of the upper contact terminal 130, the conductive shell 110, and the nonconductive middle plate 120 may be coupled to each other and then the other one may be additionally coupled. That is, the nonconductive middle plate 120 may be insert molded into the upper contact terminal 130, and the upper contact terminal 130 may be integrally coupled to the conductive shell 110 with the nonconductive middle plate 120 being interposed therebetween by laser welding a portion of the upper contact terminal 130 that is not electrically connected with the terminal unit 11 of the first card 10 onto the conductive shell 110. Specifically, the upper contact terminal 130 and the conductive shell 110 are prepared separately by molding (see FIGS. 16A and 16B), and then the upper contact terminal 130 is put into the injection molding machine and is insert molded to be integrally formed with the nonconductive middle plate 120 (see FIG. 16C). Next, the conductive shell 110 is layered on the insert molded nonconductive middle plate 120 (see FIG. 16D), and the dummy contact terminal 130A of the upper contact terminal 130 that is not electrically connected with the terminal unit 11 of the first card 10 is welded onto the inner surface of the conductive shell 110 (see FIG. 16E).

When the conductive shell 110 with which the nonconductive middle plate 120 and the upper contact terminal 130 are integrally formed is molded, the lower housing 140 with which the lower contact terminal 150 to be coupled to the lower portion of the conductive shell 110 is integrally formed by insert molding is prepared (S130). Since such a lower housing 140 is formed separately from the conductive shell 110, the lower housing 140 may be molded at the same time when the conductive shell 110 is molded.

When the conductive shell 110 with which the nonconductive middle plate 120 and the upper contact terminal 130 are integrally formed, and the lower housing 140 with which the lower contact terminal 150 is integrally formed are prepared, the step S140 of coupling these components is performed. When the conductive shell 110 and the lower housing 140 are coupled to each other by fitting the conductive shell 110 into the lower housing 140, the shell sidewall portion 112 of the conductive shell 110 which is elastically deformable is temporarily deformed, and the locking projection 143 formed on the housing sidewall portion 142 of the lower housing 140 is fitted into the locking groove 113 formed on the shell sidewall portion 112 of the conductive shell 110.

According to the method for manufacturing the card socket according to the above-described embodiments, the lower housing 140 is directly coupled to the conductive shell 110, such that a manufacturing process can be simplified in comparison to a related-art method for manufacturing a card socket. In addition, since the process of coupling the conductive shell 110 to the lower housing 140 can be performed by a machine in an auto assembly method, the time required to manufacture the card socket 100 can be reduced.

It will be obvious to an ordinary person skilled in the related art that the present disclosure described above is not limited by the above-described embodiments and the accompanying drawings, and various substitutions, modification, and changes can be made within the scope without departing from the technical concept of the present disclosure.

The invention claimed is:

1. A card socket which is configured to electrically connect first and second cards, each provided with a terminal unit, to an electronic device, the card socket comprising:
   a conductive shell;
   a nonconductive middle plate;
   an upper contact terminal; and
   a lower housing provided with a lower contact terminal,
   wherein the upper contact terminal is integrally coupled to the conductive shell with the nonconductive middle plate being interposed therebetween, wherein the conductive shell is coupled to the lower housing to form therein an accommodation space which is configured to accommodate both the first and second cards simultaneously, wherein the upper contact terminal is configured to be electrically connected to the terminal unit of the first card, wherein the lower contact terminal is configured to be electrically connected to the terminal unit of the second card, wherein the upper contact terminal is not configured to be electrically connected to the terminal unit of the second card, and wherein the lower contact terminal is not configured to be electrically connected to the terminal unit of the first card.

2. The card socket of claim 1, wherein the conductive shell comprises a shell base portion and at least one shell sidewall portion which extends downward from an edge of the shell base portion, and wherein the nonconductive middle plate is disposed on a lower surface of the shell base portion, spaced apart from the at least one shell sidewall portion to an inside by a predetermined distance.

3. The card socket of claim 2, wherein the lower housing comprises a housing base portion and at least one housing sidewall portion which extends upward from an edge of the housing base portion, and wherein the at least one shell sidewall portion and the at least one housing sidewall portion face each other when the conductive shell and the lower housing are coupled to each other.

4. The card socket of claim 3, wherein at least one locking projection is provided on an outside of the at least one housing sidewall portion, and at least one locking groove corresponding to the locking projection is provided on the at least one shell sidewall portion, and wherein the at least one locking projection is fitted into the at least one locking groove such that the conductive shell is coupled to the lower housing.

5. The card socket of claim 1, wherein the nonconductive middle plate is insert molded between the conductive shell and the upper contact terminal.

6. The card socket of claim 1, wherein the nonconductive middle plate is insert molded into the upper contact terminal, and a portion of the upper contact terminal that is not configured to be electrically connected with the terminal unit of the first card is laser welded onto the conductive shell.

7. The card socket of claim 1, wherein the card socket comprises an opening to allow a card tray to be inserted therethrough, and wherein an edge of the conductive shell bends at the opening as much as a thickness of the nonconductive middle plate in the shape of letter L.

8. The card socket of claim 1, wherein the lower contact terminal comprises a first lower contact terminal and a second lower contact terminal which are disposed consecutively in an insertion direction of the second card, and wherein the upper contact terminal is disposed to face a portion of the first lower contact terminal and a portion of the second lower contact terminal.

9. The card socket of claim 8, wherein a hole is formed on the conductive shell to correspond to a downward protrusion of the upper contact terminal.

10. A card connector comprising the card socket according to claim 1, and
a card tray removably inserted into the accommodation space of the card socket, wherein the card tray comprises a seating portion of a plate shape and a cover portion formed at one end of the seating portion, wherein a first concave portion is provided on one surface of the seating portion to have the first card seated thereon, and at least one second concave portion is provided on the other surface of the seating portion to have the second card seated thereon.

11. The card connector of claim 10, wherein a third concave portion is further provided on the first concave portion adjacent to the cover portion, wherein the third concave portion is positioned deviating from the second concave portion in a thickness direction of the seating portion.

12. The card connector of claim 10, comprising at least one projection protruding from at least one side surface portion of the second concave portion.

13. A method for manufacturing a card socket which comprises a conductive shell, an upper contact terminal, a nonconductive middle plate, and a lower housing provided with a lower contact terminal, wherein the upper contact terminal is integrally coupled to the shell by the middle plate, the method comprising the steps of:
molding the upper contact terminal and the shell;
integrally coupling the upper contact terminal to the shell with the middle plate being interposed therebetween;
molding the lower housing provided with the lower contact terminal; and
coupling the shell and the lower housing to each other, wherein the step of integrally coupling the upper contact terminal to the shell with the middle plate being interposed therebetween comprises a step of insert molding the middle plate between the shell and the upper contact terminal.

14. The method of claim 13, wherein the step of integrally coupling the upper contact terminal to the shell with the middle plate being interposed therebetween comprises a step of insert molding the middle plate into the upper contact terminal, and laser welding a portion of the upper contact terminal that is not electrically connected with a terminal unit of a card onto the shell.

15. The method of claim 13, wherein the shell and the upper contact terminal comprise frame portions connected thereto by at least one carrier bridge, respectively, wherein, in the step of integrally coupling the upper contact terminal to the shell with the middle plate being interposed therebetween, the carrier bridge of the shell and the carrier bridge of the upper contact terminal are disposed horizontally spaced apart from each other.

\* \* \* \* \*